(12) United States Patent
Kawashima et al.

(10) Patent No.: US 8,977,050 B2
(45) Date of Patent: Mar. 10, 2015

(54) IMAGE PROCESSING DEVICE AND IMAGE PROCESSING METHOD

(71) Applicant: Riso Kagaku Corporation, Tokyo (JP)

(72) Inventors: Masahiro Kawashima, Ibaraki-ken (JP); Mitsuharu Shiokawa, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 76 days.

(21) Appl. No.: 13/712,314

(22) Filed: Dec. 12, 2012

(65) Prior Publication Data

US 2013/0156312 A1    Jun. 20, 2013

(30) Foreign Application Priority Data

Dec. 14, 2011    (JP) ................................. 2011-273206

(51) Int. Cl.
   *G06K 9/00*     (2006.01)
   *G06T 5/00*     (2006.01)
   *H04N 1/60*     (2006.01)

(52) U.S. Cl.
   CPC ................. *G06T 5/007* (2013.01); *G06T 5/009* (2013.01); *H04N 1/6033* (2013.01); *G06T 2207/10008* (2013.01); *G06T 2207/10024* (2013.01); *G06T 2207/20008* (2013.01); *G06T 2207/30176* (2013.01)

USPC .......................................................... 382/167

(58) Field of Classification Search
   USPC ......................................... 382/162, 167, 274
   See application file for complete search history.

(56) References Cited

U.S. PATENT DOCUMENTS

| 5,710,828 | A   * | 1/1998 | Hashimoto ..................... 382/172 |
| 2008/0143736 | A1 * | 6/2008 | Clatanoff et al. ............. 345/590 |
| 2009/0027545 | A1 * | 1/2009 | Yeo et al. ....................... 348/362 |

FOREIGN PATENT DOCUMENTS

JP    2009-17375 A    1/2009

* cited by examiner

*Primary Examiner* — Phuoc Tran
(74) *Attorney, Agent, or Firm* — Nath, Goldberg & Meyer; Jerald L. Meyer; Leonid D. Thenor (57) ABSTRACT

An image processing device performs image processing on image data obtained by receiving light emitted from a light source and then reflected from an object to be read with a light receiving element. The image processing device includes a determination unit configured to determine whether or not a color of each pixel in the image data belongs to a predetermined correction target color range and a correction unit configured to perform correction to reduce the density of a pixel of the color belonging to the correction target color range.

8 Claims, 5 Drawing Sheets

IMAGE PROCESSING DEVICE AND IMAGE PROCESSING METHOD

BACKGROUND OF THE INVENTION

1. Technical Field

The present invention relates to an image processing device and an image processing method for performing image processing on image data obtained by optically reading a document.

2. Background Arts

Conventionally, an image reader is known, which obtains a read image of a document by irradiating the document with light from a light source and receiving reflected light from the document with a light receiving element, such as a CCD (Charge Coupled Device). There is proposed a technique to suppress degradation in image quality of a read image for such an image reader.

Japanese Patent Application Laid-Open No. 2009-17375 discloses a technique which corrects the region at the end part of the read image of a document by using a value obtained by reading reflected light from the region neighboring the document of the positioning plate to position the document. This technique suppresses such a disadvantage that the end part of the read image becomes dark by the influence of the positioning plate.

SUMMARY OF THE INVENTION

In the image reader, each light receiving element receives reflected light from a document in the corresponding position to be read. Here, there is a case where the light receiving element also receives reflected light from another position other than the original position to be read by the influence of diffuse reflection due to the member within the image reader. For example, there is a case where the light receiving element receives light, which is the reflected light from the margin part on a document in the original position to be read, with which the reflected light from the peripheral image part is combined. Because of this, there is a case where a phenomenon that the peripheral margin part of the image part colors in the read image occurs. Hereinafter, this phenomenon is referred to as "color trailing". The color trailing degrades the image quality of a read image.

In the technique described above, the influence of the positioning plate exerted on a read image is suppressed, but, the color trailing described above cannot be dealt with.

The present invention has been developed in view of the above issue and has the object of providing an image processing device and an image processing method capable of suppressing degradation in image quality of a read image by an image reader.

In order to achieve the above-mentioned object, there is provided an image processing device that performs image processing on image data obtained by receiving light emitted from a light source and then reflected from an object to be read with a light receiving element, the device including, a determination unit configured to determine whether or not the color of each pixel in the image data belongs to a predetermined correction target color range and a correction unit configured to perform correction to reduce the density of a pixel of the color belonging to the correction target color range.

Further, there is provided an image processing method that performs image processing on image data obtained by receiving light emitted from a light source and then reflected from an object to be read with a light receiving element, the method including determining whether or not the color of each pixel in the image data belongs to a predetermined correction target color range and performing correction to reduce the density of a pixel of the color belonging to the correction target color range.

DESCRIPTION OF THE EMBODIMENTS

An embodiment of the present invention will be explained below with reference to the accompanying drawings. In each drawing, the same or equivalent symbol is assigned to the same or equivalent region or component. However it should be noted that the drawings are schematic and different from actual ones. Further, it is needless to say that the drawings include parts different in the relationship or ratio of the dimension.

Furthermore, the embodiment shown below illustrates a device to embody the technical idea of the present invention and the technical idea does not limit arrangement etc. of each component to those described below. It is also possible to add various modifications to the technical idea in the scope of the claims.

Figure 1:
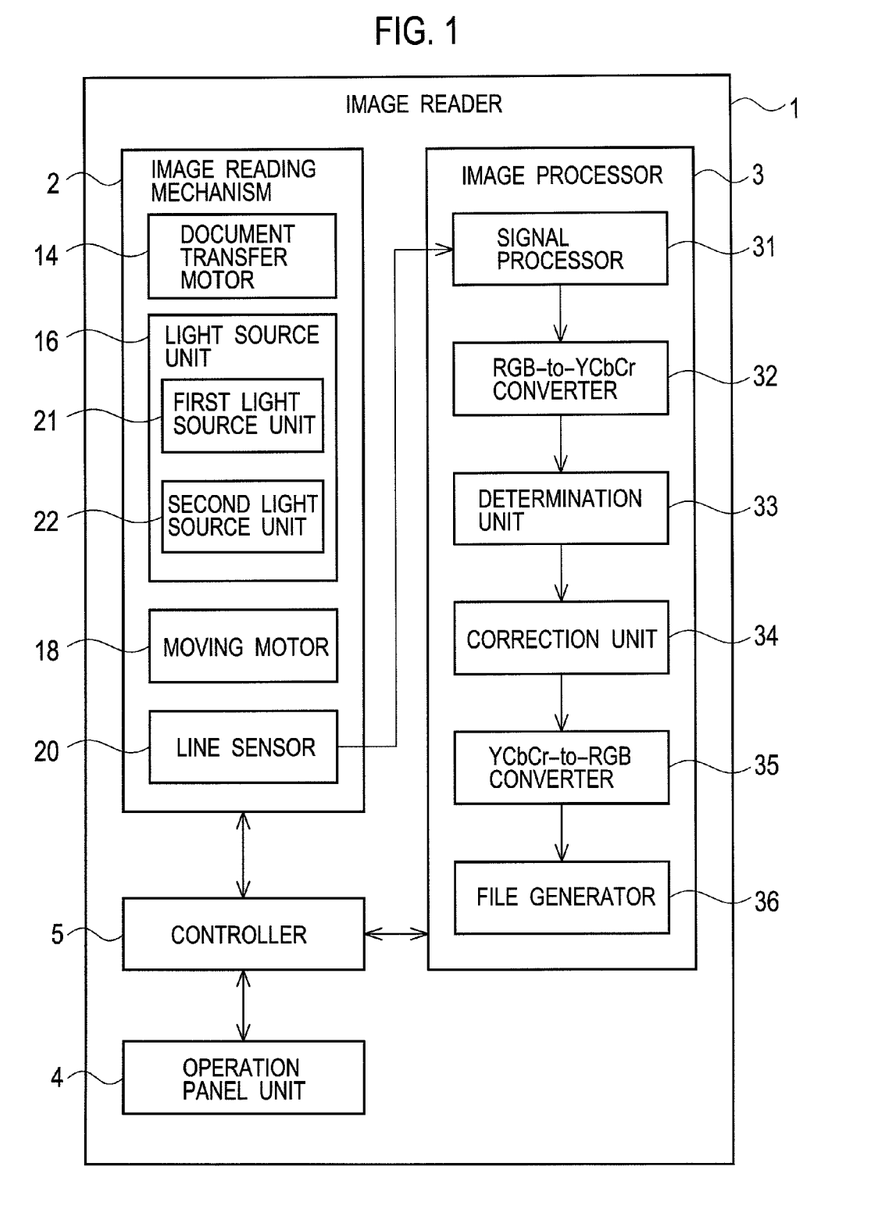
FIG. 1 is a block diagram showing a configuration of an image reader according to an embodiment.
Figure 2:
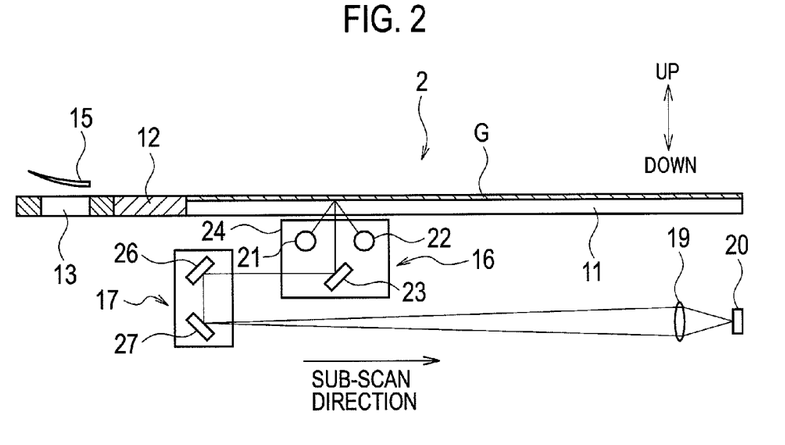
FIG. 2 is a diagram showing a schematic configuration of an image reading mechanism shown in FIG. 1.

FIG. 1 is a block diagram showing a configuration of an image reader according to an embodiment of the present invention. FIG. 2 is a diagram showing a schematic configuration of an image reading mechanism in the image reader shown in FIG. 1.

As shown in FIG. 1, an image reader 1 according to the present embodiment includes an image reading mechanism 2, an image processor 3, an operation panel unit 4, and a controller 5.

The image reading mechanism 2 irradiates a document, which is an object to be read, with light and receives reflected light from the document. As shown in FIG. 1 and FIG. 2, the image reading mechanism 2 includes a contact glass 11, a positioning plate 12, an automatic read glass 13, a document feed motor 14, a guide plate 15, a light source unit 16, a mirror unit 17, a moving motor 18, a lens 19, and a line sensor 20.

On the contact glass 11, a document G to be read in a flat-bed reading mode is placed. The flat-bed reading mode is a mode for reading the document G placed on the contact glass 11 while moving the light source unit 16 and the mirror unit 17.

The positioning plate 12 positions the document G placed on the contact glass 11. The positioning plate 12 is arranged on one end side of the contact glass 11.

The automatic read glass 13 transmits light with which the document G is irradiated and reflected light from the document G in a sheet-through reading mode. The sheet-through reading mode is a mode for reading the document G while automatically feeding the document G in the sub scan direction with the light source unit 16 and the mirror unit 17 being fixed.

The document feed motor 14 generates a driving force to feed the document G in the sheet-through reading mode. The document feed motor 14 drives a document feed mechanism including a roller etc. (not shown schematically) to feed the document G in the sub scan direction.

The guide plate 15 guides the document G that is fed onto the automatic read glass 13 in the sheet-through reading mode.

The light source unit 16 irradiates the document G with light and also outputs reflected light from the document G to the mirror unit 17. The light source unit 16 is arranged below the contact glass 11 and configured so as to be movable in the sub scan direction. The light source unit 16 includes a first light source unit 21, a second light source unit 22, a first mirror 23, and a frame body 24 that holds these units and mirror.

The first light source unit 21 and the second light source unit 22 irradiate the document G with light. The first light source unit 21 and the second light source unit 22 include a light emitting element including an LED etc. and a light guide elongated in the main scan direction, respectively. The main scan direction is a direction perpendicular to the surface of the sheet in FIG. 2 and orthogonal to the sub scan direction. Light emitted from the light emitting element is input to one end surface of the light guide and the light guide diffuses light to outside while guiding the light in the main scan direction, and thereby, the upper document G is irradiated with light.

The first light source unit 21 and the second light source unit 22 may be a cold cathode tube elongated in the main scan direction. Further, the first light source unit 21 and the second light source unit 22 may have a configuration including a substrate elongated in the main scan direction and a plurality of LEDs mounted on the substrate and arrayed in the main scan direction, respectively.

The mirror unit 17 reflects light from the light source unit 16 and outputs the light to the lens 19. The mirror unit 17 is arranged below the contact glass 11 and configured so as to be movable in the sub scan direction. The mirror unit 17 includes a second mirror 26, a third mirror 27, and a frame body 28 that holds these mirrors.

The second mirror 26 reflects light from the first mirror 23 toward the third mirror 27. The second mirror 26 is arranged substantially parallel to the first mirror 23.

The third mirror 27 reflects light from the second mirror 26 toward the lens 19. The third mirror 27 is arranged substantially perpendicular to the second mirror 26 below the second mirror 26.

The moving motor 18 generates a driving force to move the light source unit 16 and the mirror unit 17. The driving force of the moving motor 18 is transmitted to the light source unit 16 and the mirror unit 17 by a moving mechanism (not shown schematically) and thereby, the light source unit 16 and the mirror unit 17 move in the sub scan direction. The moving mechanism of the light source unit 16 and the mirror unit 17 has a structure in which the movement amount of the mirror unit 17 is made half that of the light source unit 16 and the optical path length from the document G to the line sensor 20 is kept constant.

The lens 19 collects light from the mirror unit 17 and inputs the light to the line sensor 20.

The line sensor 20 photoelectrically converts the reflected light from the document G input via the lens 19 and generates an electric signal. The line sensor 20 has a plurality of light receiving elements (not shown schematically) arrayed in the form of a line in the main scan direction. The light receiving element includes, for example, a CCD.

The image processor (image processing device) 3 A/D-converts the electric signal generated in the line sensor 20 having received light to generate image data of the document G and also performs correction on the image data to reduce the density of the color trailing image. The image processor 3 includes a signal processor 31, an RGB-to-YCbCr converter 32, a determination unit 33, a correction unit 34, a YCbCr-to-RGB converter 35, and a file generator 36.

The signal processor 31 A/D-converts the electric signal generated in the line sensor 20 and generates image data of the document G. In the present embodiment, it is assumed that the image data is data in the RGB format with eight bits for each color (256 gradations).

The RGB-to-YCbCr converter 32 converts the RGB value of each pixel in the image data in the RGB format into a value in the YCbCr format. The YCbCr format is a format that represents a color by Y (luminance) and Cb and Cr (color difference). Conversion from the RGB format into the YCbCr format can be performed by, for example, $$Y=(77 \times R+150 \times G+29 \times B)/256, \quad (1)$$

$$Cb=(-43 \times R-85 \times G+128 \times B)/256, \quad (2)$$

$$Cr=(128 \times R-107 \times G-21 \times B)/256. \quad (3)$$

The determination unit 33 determines whether or not the color of each pixel belongs to a predetermined correction target color range based on the values of Y, Cb, and Cr. Specifically, the determination unit 33 calculates a hue angle H and chroma C from the values of Cb and Cr for each pixel. Then, the determination unit 33 determines whether or not the color of each pixel belongs to the correction target color range based on the luminance Y, the hue angle H, and the chroma C. The correction target color range is supposed to be a color range of a color trailing image caused by color trailing and is set as a color range that is a correction target to reduce the density of a color trailing image.

Figure 3:
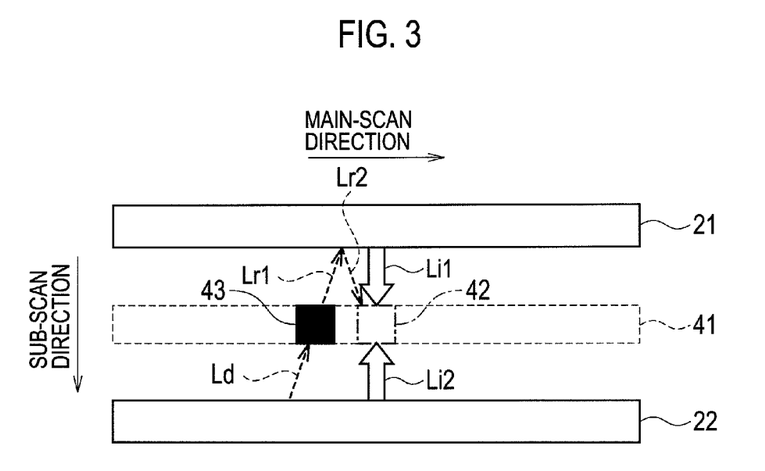
FIG. 3 is a diagram for explaining the cause of occurrence of color trailing.

Here color trailing is explained. FIG. 3 is a schematic diagram for explaining the cause of occurrence of color trailing.

In FIG. 3, a region to be read 41 is a region on the document G in which reflected light from the region is received by the line sensor 20 while the document G and the light source unit 16 are moving relative to each other. Suppose here that the light receiving element within the line sensor 20 that receives reflected light from a position to be read 42 within the region to be read 41 is a light receiving element of interest.

The light receiving element of interest receives reflected light by the position to be read 42 of light Li1 and Li2 substantially parallel to the sub scan direction from the first light source unit 21 and the second light source unit 22. At this time, there is a possibility that reflected light Lr2, which is reflected light Lr1 by a position not to be read 43, different from the position to be read 42, reflected by the constituent member of the first light source unit 21, is combined with the reflected light by the position to be read 42 of the light Li1 and Li2. Then, the composite light is received by the light receiving element of interest. The reflected light Lr1 is light Ld, which is emitted from the second light source unit 22 and not parallel to the sub scan direction, reflected by the position not to be read 43 on the document G.

Figure 4:
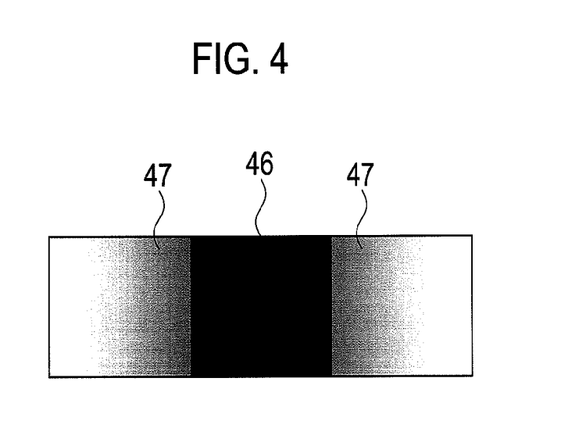
FIG. 4 is a diagram showing a color trailing image.

When the position to be read 42 is within the margin on the document G and there is an image in the position not to be read 43, the margin part of the read image colors by the reception of the composite light as described above by the light receiving element of interest. This causes an event that a color trailing image 47 in which the region on the periphery of an image 46, which is originally the margin, has colored appears, for example as shown in FIG. 4. This phenomenon is called "color trailing". The color trailing image 47 does not exist in the original document G and degrades the image quality of a read image.

The color trailing image 47 tends to appear in the main scan direction relative to the image 46. The color of the color trailing image 47 is a color in the same hue as that of the image 46 and the density thereof is lower than that of the image 46. Although the example of FIG. 3 assumes that the reflected light Lr2 that the constituent member of the first light source unit 21 reflects causes color trailing, there is also a case where light that another member within the image reading mechanism 2 reflects causes color trailing.

The configuration of the image reading mechanism 2 identifies the color region in which color trailing tends to occur in advance. For example, there exists a color region in which color trailing tends to occur depending on the wavelength of light of the first light source unit 21 and the second light source unit 22. Because of this, the correction target color range described above is set, for example, at the time of shipping from factory of the image reader 1. Alternatively, it is possible for a service person etc. to set of the correction target color range by the operation of the operation panel unit 4 after the shipping of the image reader 1.

The correction target color range is specified by a combination of the luminance Y, the hue angle H, and the chroma C. That is, the correction target color range is specified as "$Yth1 \leq Y \leq Yth2$, and $Hth1 \leq H \leq Hth2$, and $Cth \leq C \leq Cth2$". Here Yth1 and Yth2 are threshold values of the luminance Y, Hth1 and Hth2 are threshold values of the hue angle H, and Cth1 and Cth2 are threshold values of the chroma C. It may be also possible to set a plurality of correction target color ranges. As described previously, the density (luminance) of the color trailing image 47 is lower (higher) than the density (luminance) of the image 46, and therefore, the range of the luminance in the correction target color range is a range in which the luminance is comparatively high.

Figure 5:
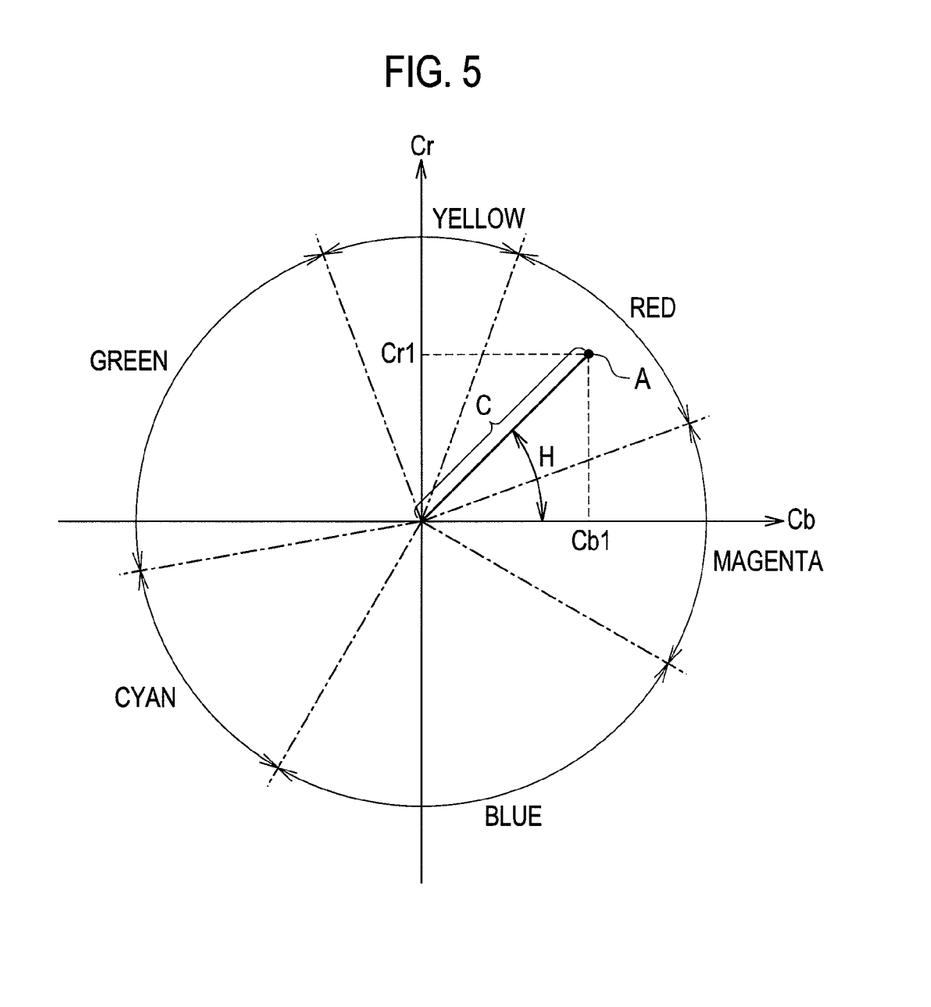
FIG. 5 is a diagram for explaining a calculation method of a hue angle and chroma.

The hue angle H is calculated as an angle formed by a line connecting the point (Cb1, Cr1) at which the Cb value and the Cr value are plotted and the origin (0, 0) of a CbCr plane and the Cb axis on the CbCr plane. For example, as shown in FIG. 5, the hue angle H of the pixel corresponding to a point A (Cb1, Cr1) on the CbCr plane is calculated by $$H = \tan^{-1}(Cr1/Cb1) \tag{4}$$

Further, the chroma C is calculated as a distance between the point (Cb1, Cr1) at which the Cb value and the Cr value are plotted and the origin (0, 0) of the CbCr plane on the CbCr plane. For example, the chroma C of the pixel corresponding to the point A of FIG. 5 is calculated by $$C = (Cb1^2 + Cr1^2)^{1/2} \tag{5}$$

The correction unit 34 performs correction to reduce the density of each pixel of the color belonging to the correction target color range. Specifically, the correction unit 34 performs correction to increase the value of the luminance Y of the pixel belonging to the correction target color range. Here the value of the luminance Y is indicated by the value between 0 and 255 from dark toward bright. Therefore the density of the pixel is reduced by increasing the value of the luminance Y of the pixel.

Figure 6:
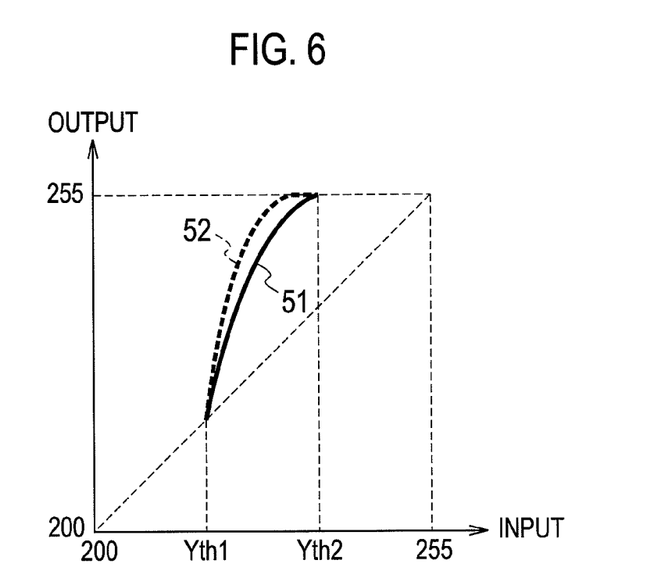
FIG. 6 is a diagram showing a correction curve in a first correction target color range.
Figure 7:
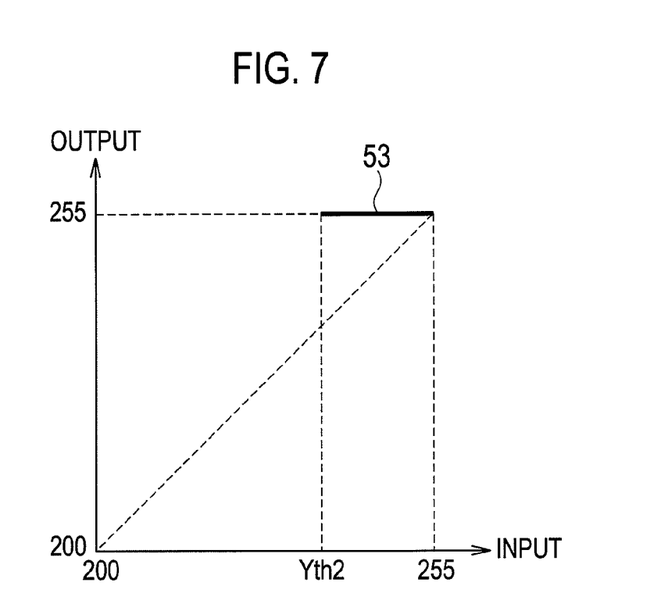
FIG. 7 is a diagram showing a correction curve in a second correction target color range.

The correction unit 34 performs correction of the density (luminance) for each correction target color range. For example, it is assumed that "$Yth1 \leq Y \leq Yth2$, and $Hth1 \leq H \leq Hth2$, and $Cth1 \leq C \leq Cth2$" is set as a first correction target color range and "$Y > Yth2$ and the entire range of the hue angle H and the chroma C" is set as a second correction target color range. In this case, the correction unit 34 performs correction based on, for example, correction curves shown in FIG. 6 and FIG. 7, respectively, for the luminance Y of the pixels of the colors belonging to the first correction target color range and the second correction target color range. In FIG. 6 and FIG. 7, the horizontal axis represents the input value, which is the value of the luminance Y before correction, and the vertical axis represents the output value, which is the value of the luminance Y after correction. FIG. 6 and FIG. 7 show that the output value is increased relative to the input value, that is, the density of the pixels is reduced.

In FIG. 6, a correction curve 51 corresponds to the copy mode specified as the image processing mode. A correction curve 52 corresponds to the scan mode. In the case of the copy mode, the correction amount of the luminance is set to a level so that the image of the original document G does not disappear. On the other hand, in the case of the scan mode, priority is given to suppression of the amount of data when image data is converted into a file, and therefore the correction amount of the luminance is made larger than that in the case of the copy mode as shown in FIG. 6. The correction unit 34 adjusts the correction amount of the density (luminance) by selecting the correction curve 51 or the correction curve 52 in accordance with the specified image processing mode. The image processing mode can be specified by a user by the operation of the operation panel unit 4.

In FIG. 7, the correction curve 53 is in the form of a straight line and indicates that the luminance Y in the range of Y>Yth2 is corrected to 255, the maximum value. The correction curve 53 is used in common both in the copy mode and in the scan mode.

The YCbCr-to-RGB converter 35 converts the value in the YCbCr format of each pixel into an RGB value. For the pixel corrected by the correction unit 34, the YCbCr-to-RGB converter 35 converts the value in the YCbCr format after correction into an RGB value. Conversion from the YCbCr format into the RGB format can be performed by, for example, $$R = (256 \times Y + 359 \times Cr)/256, \tag{6}$$

$$G = (256 \times Y - 88 \times Cb - 183 \times Cr)/256, \tag{7}$$

$$B = (256 \times Y + 454 \times Cb)/256. \tag{8}$$

The file generator 36 converts image data into a file in a predetermined format, such as PDF, in the scan mode.

The operation panel unit 4 displays various kinds of information and also receives the input operation of a user. The operation panel unit 4 includes a liquid crystal display panel etc. to display various kinds of information etc., operation buttons, a touch panel, etc., for a user to perform various kinds of input operations. The operation panel unit 4 may be one which a printing device to which the image reader 1 is connected includes.

The controller 5 controls the operation of the whole of the image reader 1.

The image reader 1 is configured so as to include a CPU, RAM, ROM, etc. When the CPU executes programs, the functions of the image processor 3 and the controller 5 are implemented.

Next, the operation of the image reader 1 is explained.

Under the flat-bed reading mode, the controller 5 causes the first light source unit 21 and the second light source unit 22 to light up and causes the line sensor 20 to receive reflected light from the document G while moving the light source unit 16 and the mirror unit 17 in the sub scan direction by the moving motor 18.

Under the sheet-through reading mode, the controller 5 causes the light source unit 16 to move directly under the automatic read glass 13 by the moving motor 18. Then, the controller 5 causes the first light source unit 21 and the second light source unit 22 to light up and causes the line sensor 20 to receive reflected light from the document G while feeding the document G in the sub scan direction by the document feed motor 14.

The line sensor 20 having received reflected light from the document G outputs an electric signal in accordance with the amount of received light. The signal processor 31 of the image processor 3 A/D-converts the electric signal output from the line sensor 20 and generates image data.

The image processor 3 performs correction processing on the image data obtained as described above to reduce the density of the color trailing image. This correction processing is explained with reference to the flowchart of FIG. 8.

Figure 8:
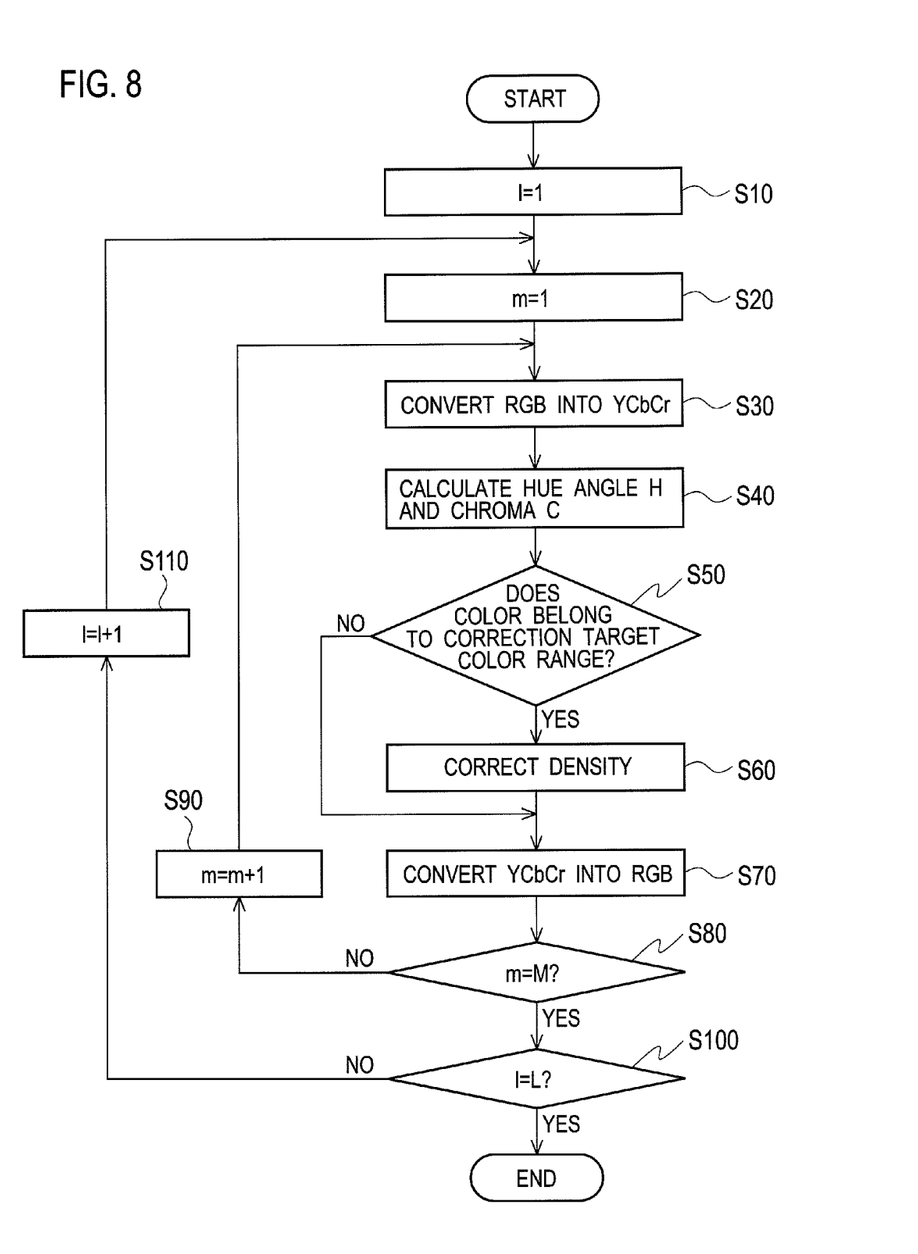
FIG. 8 is a flowchart of correction processing.

At step S10 of FIG. 8, the controller 5 sets "1" to a variable "1" indicating the line number in the image data.

At step S20, the controller 5 sets "1" to a variable "m" indicating the pixel number on the line.

At step S30, the RGB-to-YCbCr converter 32 converts the RGB value of the m-th pixel (pixel of interest) of the first line into a value in the YCbCr format.

At step S40, the determination unit 33 calculates the hue angle H and the chroma C from the values of Cb and Cr of the pixel of interest.

At step S50, the determination unit 33 determines whether or not the color of the pixel of interest belongs to the set correction target color range based on the luminance Y, the hue angle H, and the chroma C. When a plurality of correction target color ranges is set, the determination unit 33 determines whether or not the color of the pixel of interest belongs to any of the plurality of correction target color ranges that is set.

When the determination unit 33 determines that the color of the pixel of interest belongs to the correction target color range (step S50: YES), the correction unit 34 performs density correction of the pixel of interest at step S60. Specifically, the correction unit 34 corrects the luminance of the pixel of interest based on the correction curves as shown in FIG. 6 and FIG. 7 in accordance with the correction target color range to which the color of the pixel of interest belongs and the specified image processing mode.

Next, at step S70, the YCbCr-to-RGB converter 35 converts the value in the YCbCr format of the pixel of interest after correction by the correction unit 34 into an RGB value.

When the determination unit 33 determines that the color of the pixel of interest does not belong to any of the correction target color ranges (step S50: NO), correction of the pixel of interest is omitted and at step S70, the YCbCr-to-RGB converter 35 converts the value in the YCbCr format of the pixel of interest into an RGB value.

Next, at step S80, the controller 5 determines whether or not the variable m is M indicating the last pixel on one line.

When determining that m is not equal to M (step S80: NO), the controller 5 adds "1" to the variable m at step S90. After this, the processing returns to step S30.

When determining that m=M (step S80: YES), the controller 5 determines whether or not the variable 1 is L indicating the last line at step S100.

When determining that 1 is not equal to L (step S100: NO), the controller 5 adds "1" to the variable 1 at step S110. After this, the processing returns to step S20.

When the controller 5 determines that 1=L (step S100: YES), the correction processing is exited.

When the image processing mode is the copy mode, the controller 5 outputs the image data in the RGB format after correction processing to the printing device. The image data is converted, for example, into the CMYK format in the printing device and used in printing.

When the image processing mode is the scan mode, the controller 5 converts the image data in the RGB format after correction processing into a file in a predetermined format by the file generator 36. After this, the controller 5 outputs the image data converted into a file to a storage device etc.

As explained above, in the image reader 1, the correction unit 34 performs correction to reduce the density of the pixel of the color belonging to the correction target color range. This enables the image reader 1 to reduce the density of the color trailing image. As a result, the image reader 1 can suppress degradation in image quality of a read image.

Further, the image reader 1 sets a plurality of correction target color ranges and corrects the density for each correction target color range. This leads to perform fine correction and to reliably reduce the density of a color trailing image. It may be also possible to change the setting of the correction target color range in accordance with the specified image processing mode.

Furthermore, since adjusting the correction amount of density in accordance with the specified image processing mode, the image reader 1 can perform appropriate density correction in accordance with the image processing mode.

Although in the above-mentioned embodiment the image data in the RGB format is converted into data in the YCbCr format and correction processing is performed using this, it may be also possible to convert the image data in the RGB format into data in another format, such as the L*a*b display system, and to perform correction processing using this.

The present invention is not limited to the above-mentioned embodiment, and it is possible to embody the present invention by modifying the components in the range that does not depart from the scope thereof. Further, it is possible to form various kinds of inventions by appropriately combining a plurality of components disclosed in the above-mentioned embodiment. For example, it may be possible to omit several components from all of the components shown in the above-mentioned embodiment.

The present application claims the benefit of priority under 35 U.S.C §119 to Japanese Patent Application No. 2011-273206, filed on Dec. 14, 2011, the entire content of which is incorporated herein by reference.

What is claimed is:

1. An image processing device that performs image processing on image data obtained by receiving light emitted from a light source and then reflected from an object to be read with a light receiving element, comprising:
    a determination unit configured to determine whether or not a color of each pixel in the image data belongs to a predetermined correction target color range; and
    a correction unit configured to perform correction to reduce the density of a pixel of the color belonging to the correction target color range.

2. The image processing device according to claim 1, wherein
    the determination unit is capable of setting a plurality of the correction target color ranges, and
    the correction unit corrects the density for each correction target color range.

3. The image processing device according to claim 1, wherein
the correction unit adjusts a correction amount of density in accordance with a specified image processing mode.

4. The image processing device according to claim 1, further comprising:
a converter for converting an RGB value of each pixel in the image data into a YCbCr value,
wherein the determination unit is configured to determine whether or not a color of each pixel in the image data belongs to a predetermined correction target color range based on the YCbCr value.

5. An image processing method for performing image processing on image data obtained by receiving light emitted from a light source and then reflected from an object to be read with a light receiving element, comprising:
determining whether or not a color of each pixel in the image data belongs to a predetermined correction target color range; and
performing correction to reduce the density of a pixel of the color belonging to the correction target color range.

6. The image processing method according to claim 5, wherein the method,
when making the determination, is capable of setting a plurality of the correction target color ranges, and
when performing the correction, corrects the density for each correction target color range.

7. The image processing method according to claim 5, wherein the method, when performing the correction, adjusts a correction amount of density in accordance with a specified image processing mode.

8. The image processing method according to claim 5, further comprising:
converting an RGB value of each pixel in the image data into a YCbCr value,
wherein the determining is performed based on the YCbCr value.

* * * * *